US011054221B2

(12) United States Patent
Parison et al.

(10) Patent No.: US 11,054,221 B2
(45) Date of Patent: Jul. 6, 2021

(54) LAR DISPLAY SYSTEM AND METHOD

(71) Applicant: BAE Systems plc, London (GB)

(72) Inventors: Jason Paul Parison, Yeovil (GB); David Rawlinson, Yeovil (GB)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 16/617,847

(22) PCT Filed: May 11, 2018

(86) PCT No.: PCT/GB2018/051282
§ 371 (c)(1),
(2) Date: Nov. 27, 2019

(87) PCT Pub. No.: WO2018/220342
PCT Pub. Date: Dec. 6, 2018

(65) Prior Publication Data
US 2020/0191530 A1 Jun. 18, 2020

(30) Foreign Application Priority Data
Jun. 1, 2017 (GB) .................................. 1708743

(51) Int. Cl.
G06T 11/00 (2006.01)
F41G 9/00 (2006.01)
G06T 11/60 (2006.01)

(52) U.S. Cl.
CPC .............. F41G 9/002 (2013.01); G06T 11/60 (2013.01)

(58) Field of Classification Search
None
See application file for complete search history.

(56) References Cited

U.S. PATENT DOCUMENTS 6,658,980 B1 * 12/2003 Hayes .................... F41G 7/006
706/24
2003/0183720 A1 * 10/2003 La Fata ............... G01S 13/9023
244/3.19
(Continued)

FOREIGN PATENT DOCUMENTS

EP        2881697 A1       6/2015
WO     20070020477 A2     2/2007
WO   WO-2015074967 A1 *   5/2015   ............... F41G 3/22

OTHER PUBLICATIONS

PCT Search Report and Written Opinion for Appl No. PCT/GB2018/051282 dated Jul. 24, 2018, 15 pages.
(Continued)

Primary Examiner — Martin Mushambo
(74) Attorney, Agent, or Firm — Maine Cernota & Rardin

(57) ABSTRACT

A Launch Acceptability Region [LAR] display system and method for a payload-releasing platform, the system being configured to be communicably coupled to a LAR computing module (104) configured to compute LAR data representative of a Launch Acceptability Region in respect of said platform based on a set of input parameters and predefined payload performance parameters, the system comprising: —an input module (100) configured to obtain or receive a first input parameter value in respect of a first of said input parameters, generate a set of second input parameter values in respect of said first of said input parameters, said second input parameter values being different to and at respective intervals from, said first input parameter value, and input said first input parameter value and said second input parameter values to said LAR computing module so as to cause said LAR computing module to compute, based on each of said first and second input parameter values, a respective LAR and output a set of LAR data, each data item of said set of LAR data being representative of a respective (Continued)

LAR and the input parameter value on which it is based; —an image data generation module (106) configured to receive said set of LAR data and generate therefrom a set of LAR image data, each data item of said set of LAR image data being representative of a respective data item of said set of LAR data; and—a display module (108) configured to receive said set of LAR image data and display, simultaneously, a visual representation of each LAR, wherein the relative positions in said display of said visual representations is based on their respective associated input parameter value.

16 Claims, 5 Drawing Sheets

(56) References Cited

U.S. PATENT DOCUMENTS

| | | | | |
|---|---|---|---|---|
| 2009/0173789 | A1* | 7/2009 | Howard | F41G 9/002 235/412 |
| 2010/0128995 | A1* | 5/2010 | Drugeon | H04N 19/51 382/238 |
| 2014/0218395 | A1* | 8/2014 | Momonoi | G06T 11/60 345/629 |
| 2015/0059564 | A1* | 3/2015 | De Sa | F42C 99/00 89/1.11 |
| 2015/0316352 | A1 | 11/2015 | Eriksson et al. | |
| 2015/0369566 | A1* | 12/2015 | Featherston | G06T 11/203 345/441 |
| 2016/0069643 | A1* | 3/2016 | Lyren | G09B 19/0038 345/589 |
| 2016/0298931 | A1 | 10/2016 | Ranat et al. | |
| 2020/0258268 | A1* | 8/2020 | Lyren | G09B 19/0038 |

OTHER PUBLICATIONS

Great Britain Search Report for Appl No. GB1708743.9 dated Nov. 22, 2017, 3 pages.

International Preliminary Report on Patentability for Appl No. PCT/GB2018/051282 dated Dec. 3, 2019, 10 pages.

* cited by examiner

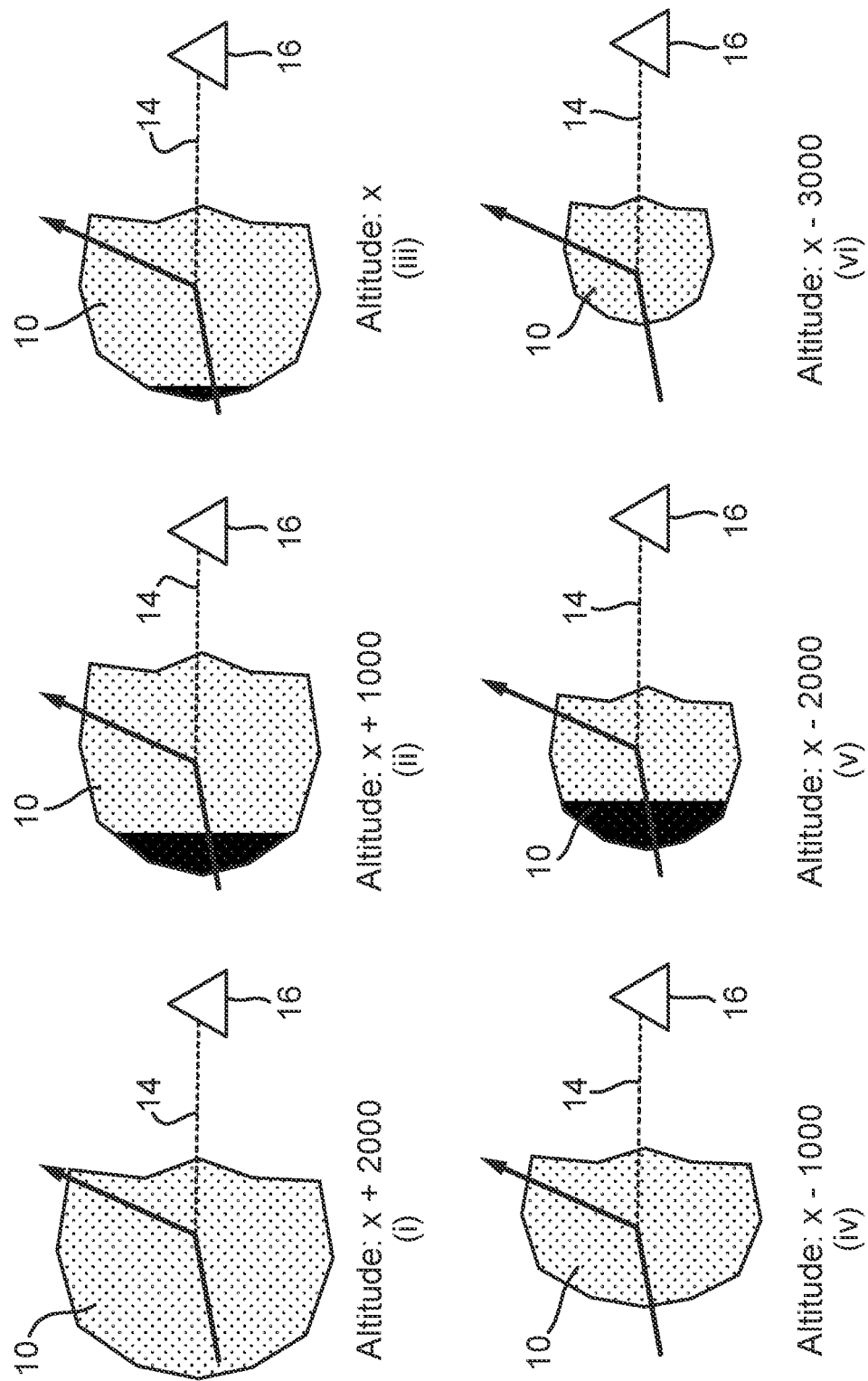

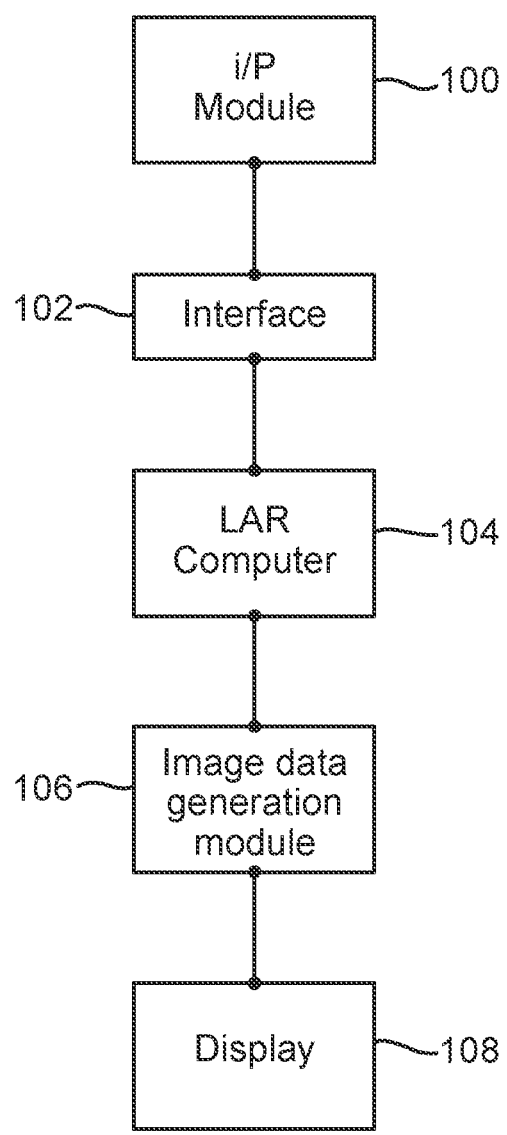

LAR DISPLAY SYSTEM AND METHOD

RELATED APPLICATIONS

This application is a national phase application filed under 35 USC § 371 of PCT Application No. PCT/GB2018/051282 with an International filing date of May 11, 2018 which claims priority of GB Patent Application 1708743.8 filed Jun. 1, 2017. Each of these applications is herein incorporated by reference in its entirety for all purposes.

This invention relates generally to a Launch Acceptability Region (LAR) display system and method for use in, for example, mission planning systems of payload-releasing platforms, particularly but not necessarily exclusively suited to use in the field of air-to-surface munitions.

Platforms for releasing payloads often include systems for assisting personnel in achieving mission objectives, particularly in the field of air-to-surface munitions. The effectiveness and accuracy of payload release planning has seen significant improvements since the introduction of laser guidance and control systems, wherein such planning can be very specific and precise, both in terms of target selection and maximising impact accuracy on the selected targets. More recently, GPS-guided systems have been introduced that have resulted in further improvements in payload release applications.

Laser-guided (and, more recently, GPS-guided) payloads are known to behave in certain ways under given release and impact parameters. These characteristics can be captured and utilized in a number of ways such that an aircraft plan can be produced whereby the planned release point or area can be selected in order to achieve a given impact success—such an area is known as a Launch Acceptability Region (LAR).

Systems are known for providing and displaying an indication of a Launch Acceptability Region, for a given release altitude and other input conditions, based on a set of payload performance parameters, such as, but not limited to, a maximum altitude at which the payload may be released, a maximum g-force at which the payload may be released, and (where appropriate) the release mechanism of the payload. These performance parameters are typically provided by the payload manufacturer (OEM). Indeed, more recently, such OEMs make electronic versions of such LAR systems available to mission planning computer systems. Payloads, for example, include air-to-surface weapons such as free-fall and guided bombs, sonobuoys, and decoys. Payloads also include air-to-air or anti-satellite weapons.

FIG. 1a illustrates a displayed LAR on the plane of flight of a launch aircraft 1 flying along a flight path 3 in respect of a target 5 for an air-to-surface weapon (not shown) loaded on the aircraft 1. The LAR is calculated to provide cockpit displays in the launch aircraft 1 concerning the feasibility and firing opportunities for the situation. FIG. 1b shows the display generated for the LAR of FIG. 1a, which is in the form of a downrange and cross range display (the shaded area), where the weapon flight path 7 coincides with the aircraft flight path 3. In order to successfully engage the target 5 as shown in the display, the weapon must be released when the aircraft 1 is inside the shaded LAR.

However, known Mission Planning systems only visualise a LAR for a given release altitude and other input conditions, and provide the operator with little, if any, awareness of weapon behaviour outside of those given conditions. Nevertheless, there are many circumstances in which such enhanced operator awareness would be highly beneficial. Furthermore, the displayed LAR does not take into account changing variables, such as wind conditions, for example, which can result in the displayed LAR being inaccurate and certainly less than optimal at any given point in time.

Aspects of the present invention seek to address at least some of these issues and, in accordance with a first aspect of the present invention, there is provided a Launch Acceptability Region (LAR) display system for a payload-releasing platform, the system being configured to be communicably coupled to a LAR computing module configured to compute LAR data representative of a Launch Acceptability Region in respect of said platform based on a set of input parameters and predefined payload performance parameters, the system comprising:

an input module configured to obtain or receive a first input parameter value in respect of a first of said input parameters, generate a set of second input parameter values in respect of said first of said input parameters, said second input parameter values being different to and at respective intervals from, said first input parameter value, and input said first input parameter value and said second input parameter values to said LAR computing module so as to cause said LAR computing module to compute, based on each of said first and second input parameter values, a respective LAR and output a set of LAR data, each data item of said set of LAR data being representative of a respective LAR and the input parameter value on which it is based;

an image data generation module configured to receive said set of LAR data and generate therefrom a set of LAR image data, each data item of said set of LAR image data being representative of a respective data item of said set of LAR data; and a display module configured to receive said set of LAR image data and display, simultaneously, a visual representation of each LAR, wherein the relative positions in said display of said visual representations is based on their respective associated input parameter value.

In an exemplary embodiment of the present invention, the visual representation of each LAR may include an indication of its respective associated input parameter value.

Optionally, the input module may be configured, in response to receiving or obtaining said first input parameter value, to compute each of said second input parameter values based on a selected or predefined interval. Thus, the user/operator can, in some exemplary embodiments, select an interval value (and, optionally, even the number of intervals each side of the first input parameter value) according to the level of detail and/or variation in input conditions they wish to visualise.

The system may further comprise an extrapolation module configured to receive said set of LAR data and extrapolate LAR data computed at adjacent input parameter values to generate intermediate LAR data, and include in said set of LAR data said intermediate LAR data for input to said image generation module. Thus, in this case, a certain number of LARs can be calculated using the input parameter values obtained/received/generated by the input module, and then additional "LARs" can be obtained by extrapolation between adjacent levels defined by these values.

The input module may be configured to obtain or receive a plurality of first input parameter values in respect of each of a respective plurality of said input parameters, generate in respect of each of said plurality of input parameters, a respective set of second input parameter values, said second input parameter values being different to and at respective intervals from, the respective first input parameter value, and cause said LAR computing module to compute a set of LAR data in respect of each of said plurality of input parameters. Thus, purely by way of example, the user could select a first input parameter value for release altitude and also select a first input parameter value for release velocity (or, indeed, any other pair of input parameters). The input module generates a set of second input parameter values for release altitude at intervals around the respective first parameter value, and a set of second input parameter values for release velocity around the respective first input parameter value, so as to generate a two sets of input parameter values, one for release altitude and the other for release velocity. These sets of input parameter values can both be input to the LAR computing module to generate respective sets of LAR data.

In this case, the display module may, optionally, be configured to display a visual representation of each said set of LAR data simultaneously. Indeed, in an exemplary embodiment, a visual representation of at least a first one of said sets of LAR data may be displayed superimposed on at least a second one of said sets of LAR data, and positioned relative thereto.

More generally, the display module may be configured to display a visual representation of a set of LAR data relative to a visual representation of a current position of said platform.

In an exemplary embodiment, the input module may be configured to obtain or receive first input parameter values and generate a respective set of second input parameter values in respect of a plurality of said input parameters, generate an input data set, wherein a data item of said input data set comprises said first input parameter values, and each other data item of said input data set comprises one second input parameter value in respect of each of said plurality of input parameters, and input said input data set to said LAR computing module so as to cause said LAR computing module to compute, based on each of said data items, a respective LAR and output a respective set of LAR data. In other words, the input module may be configured to adjust two (or more) input parameter values between each LAR computation.

The input parameters may comprise payload release conditions, which may be in respect of the platform operation (i.e. release altitude or release velocity, for example) or meteorological conditions (e.g. wind speed or direction). Thus, a system according to exemplary embodiments of the invention may be configured to adapt to dynamically changing payload release conditions to ensure that the operator has up-to-date information available, particularly useful in the case of unplanned events.

The visual representation of LARs may be in the form of a two- or three-dimensional render, although the present invention is not necessarily intended to be limited in this regard. Indeed, the system may be configured to enable a user to select a format of display of said visual representation of LARs.

In accordance with another aspect of the present invention, there is provided a computer-implemented Launch Acceptability Region (LAR) display method for a payload-releasing platform, the method being for use with a LAR computing module configured to compute LAR data representative of a Launch Acceptability Region in respect of said platform based on a set of input parameters and predefined payload performance parameters, the method comprising:

using an input module to obtain or receive a first input parameter value in respect of a first of said input parameters, generate a set of second input parameter values in respect of said first of said input parameters, said second input parameter values being different to and at respective intervals from, said first input parameter value, and input said first input parameter value and said second input parameter values to said LAR computing module so as to cause said LAR computing module to compute, based on each of said first and second input parameter values, a respective LAR and output a set of LAR data, each data item of said set of LAR data being representative of a respective LAR and the input parameter value on which it is based;

using an image data generation module to receive said set of LAR data and generate therefrom a set of LAR image data, each data item of said set of LAR image data being representative of a respective data item of said set of LAR data; and using a display module to receive said set of LAR image data and display, simultaneously, a visual representation of each LAR, wherein the relative positions in said display of said visual representations is based on their respective associated input parameter value.

An aspect of the present invention extends to a program or plurality of programs arranged such that execution thereof by a computer system causes the computer system to perform the method substantially as described above.

In accordance with yet another aspect of the present invention, there is provided a method of providing a Launch Acceptability Region (LAR) system for a payload-releasing platform, the method comprising:

providing a LAR computing module configured to compute LAR data representative of a Launch Acceptability Region in respect of said platform based on a set of input parameters and predefined payload performance parameters;

configuring an input module to obtain or receive a first input parameter value in respect of a first of said input parameters, generate a set of second input parameter values in respect of said first of said input parameters, said second input parameter values being different to and at respective intervals from, said first input parameter value, and input said first input parameter value and said second input parameter values to said LAR computing module so as to cause said LAR computing module to compute, based on each of said first and second input parameter values, a respective LAR and output a set of LAR data, each data item of said set of LAR data being representative of a respective LAR and the input parameter value on which it is based;

configuring an image data generation module to receive said set of LAR data and generate therefrom a set of LAR image data, each data item of said set of LAR image data being representative of a respective data item of said set of LAR data; and configuring a display module to receive said set of LAR image data and display, simultaneously, a visual representation of each LAR, wherein the relative positions in said display of said visual representations is based on their respective associated input parameter value.

Thus, aspects of the present invention provide a system and method for presenting an operator with an enhanced awareness of weapon behaviour at, above and below combinations of input parameters, such enhanced awareness including, but not limited to, how release altitude may affect a weapon release area. The system and/or method of exemplary embodiments of the present invention may be configured to present information in a number of novel visual perspectives by facilitating new two- and three-dimensional visualisations to provide the above-referenced enhanced awareness.

These and other aspects of the present invention will be apparent from the following specific description, in which an embodiment of the present invention is described, by way of example only, and with reference to the accompanying drawings, in which.

Figure 4:
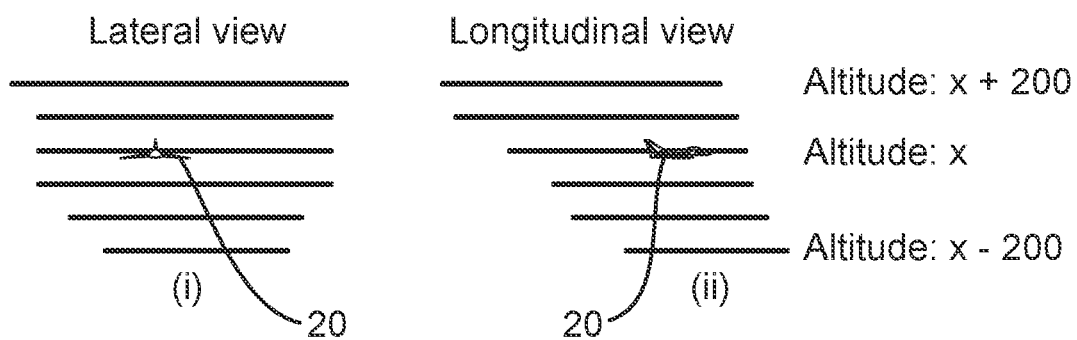
Figure 5:
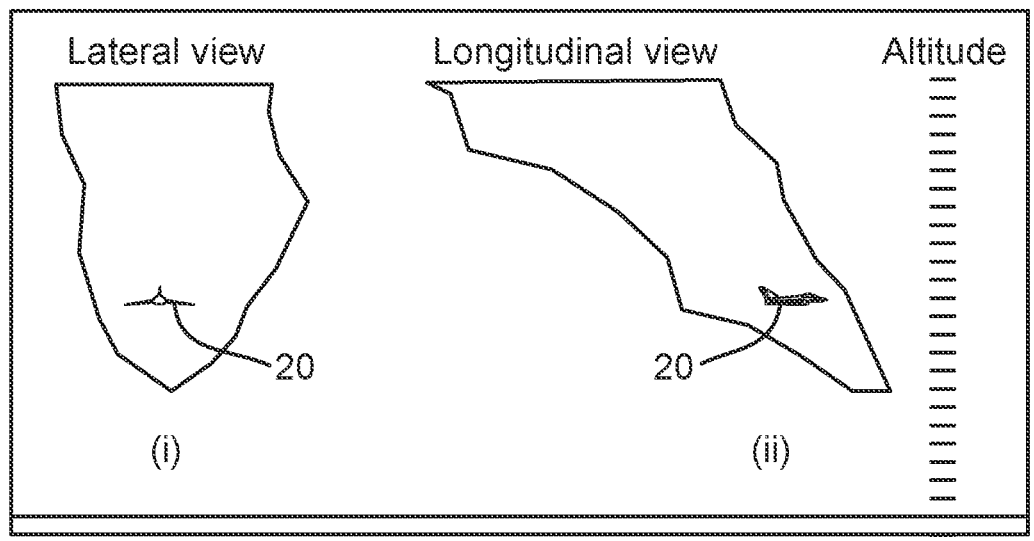
Figure 6:
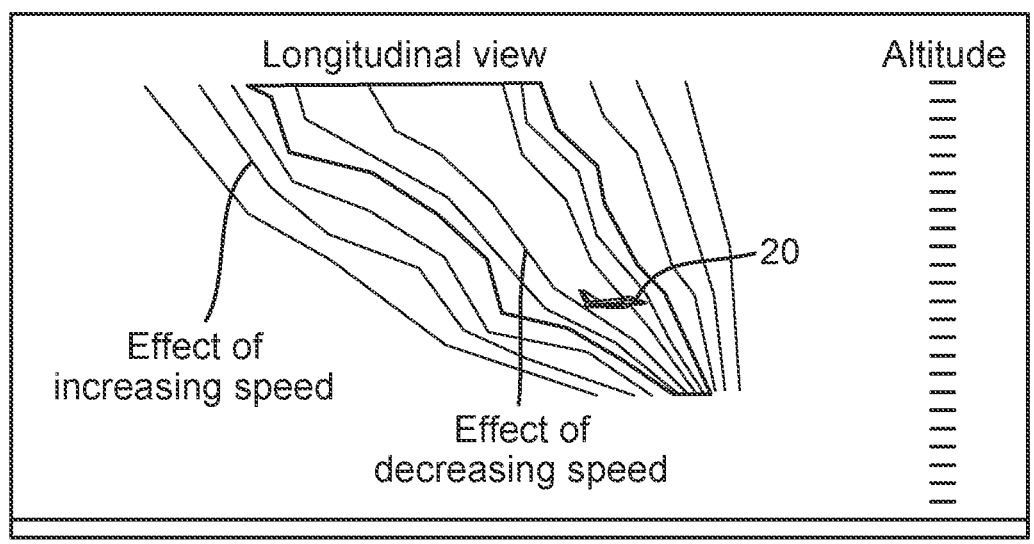

FIG. 3 provides a multiple schematic diagrams illustrating a plan view representation of a respective multiple LAR regions computer by a OEM LAR "computer" in respect of respective multiple different release altitude values;

FIG. 4 is a schematic diagram illustrating elevation views (longitudinal and lateral) representative of the data illustrated in FIG. 3;

FIG. 5 is a schematic diagram illustrating rendered elevation views (longitudinal and lateral) representing multiple LAR regions computed at multiple different respective release altitudes and extrapolated between steps to provide a graduated representation of the data;

FIG. 6 is a schematic diagram illustrating the longitudinal view of FIG. 5 with a second longitudinal view superimposed thereon, the second longitudinal view being representative of multiple LAR regions computed at multiple different respective release velocities; and FIG. 7 is a schematic block diagram illustrating components or elements of a LAR system according to an exemplary embodiment of the present invention.

Aspects of the present invention provide a novel way of calculating and displaying acceptable launch regions based upon the output of the LAR system (e.g. an OEM LAR "computer"), so as to provide an operator with a number of unique visual perspectives, including novel two- and three-dimensional information displays. As a result, the operator is presented with an enhanced awareness of weapon behaviour at, above and below combinations of input parameters including, but not limited to, how release altitude may affect the weapon release area; thereby significantly increasing the dynamic nature of the displayed information and the operator's ability to make informed mission decisions based on changing conditions (i.e. input parameters) and improving the accuracy and success of the mission.

Referring to FIG. 7 of the drawings, an LAR system according to an exemplary embodiment of the present invention comprises an input module 100 and interface 102 configured to generate input parameter values in a format compatible with a given OEM LAR "computer", and applying the input parameter values, thus generated, to such an OEM LAR "computer" 104 via the interface 102.

The OEM LAR "computer" 104 is pre-configured to utilise given weapon performance parameters in a calculation module to compute LAR data in respect of each set of input parameters received from the input module 100. The input module 100 may be configured to generate sets of input parameters wherein only one of the input parameter types is adjusted between sets, or any two or more (or all) of the input parameters required by the OEM LAR "computer" 104 to compute respective LAR data may be adjusted between sets, depending on user requirements and/or the application in which the invention is to be used.

The OEM LAR "computer" 104 outputs LAR data sets, each data set comprising data representative of a respective computed LAR. The LAR data sets are applied to an image data generation module 106, which is configured to generate image data sets corresponding to, and representative of, respective LAR data sets. The nature of the image data will be dependent upon the nature in which it is required to be presented to an operator, and may be variable between different exemplary embodiments, or a single embodiment may include means to enable a view mode to be adjusted by an operator according to their requirements, thus a single embodiment of the system may be capable of generating the above-mentioned image data sets in two or more different formats.

The image data sets (or a selected format thereof) are applied to a display module 108 which is configured to display the image data representative of the above-mentioned LAR data sets simultaneously on a screen, and arranged relative to each other in an intuitive and informative manner, preferably including an indication of the payload-bearing platform relative thereto, and optionally including in the displayed image an indication of the input parameter(as) adjusted between LAR data sets displayed and an indication their values.

In one exemplary embodiment of the invention, the above-mentioned LAR data sets may be computed locally in or on the payload-bearing platform or they may be computed at a ground station (i.e. remote from the payload-bearing platform) for use in mission planning. In other words, the input module 100, interface 102 and LAE computer 104 may be located in or on the payload-bearing platform or they may be located remotely therefrom, at a ground station. Similarly, the LAR data sets, thus computed may be displayed at the ground station or, indeed, in the payload-bearing platform. In other words, the display module 108 may be located at the ground station and/or in the payload-bearing platform. If the LAR data sets are computed in or on the payload-bearing platform and are required to be displayed at the ground station, that data may be transmitted to the display module 108 at the ground station for display in real time. Otherwise, i.e. if the LAR data sets have been computed at the ground station, they will be input to a local display module. As a result of viewing the LAR data sets displayed in real time (at the ground station), the planner may issue an updated set of instructions for the payload-bearing platform and transmit those instructions to its operator during a mission. In another exemplary embodiment, the LAR data sets may be displayed in real time during a mission to the payload-bearing platform operator, where here the display module 108 is a multifunction display, a helmet-mounted display (HMD) or a head-up display (HUD) situated on or in the payload-bearing platform. In the case where the LAR data sets are computed remotely therefrom, i.e. at the ground station, that data is transmitted to the display module 108 in the payload-bearing platform during a mission for display in real time. Otherwise, it is simply input to the local display. In this case, the payload-bearing platform operator is in a position to assess the current situation and alter the pre-planned mission steps/instructions in response to the real-time data.

Irrespective of the location of the computation and/or display of the LAR data sets, it will be clear that aspects of the present invention find particular utility in mission planning, especially for unplanned events (e.g. an unplanned change of platform flight path), although the present invention is not necessarily intended to be limited in this regard.

Figure 1A:
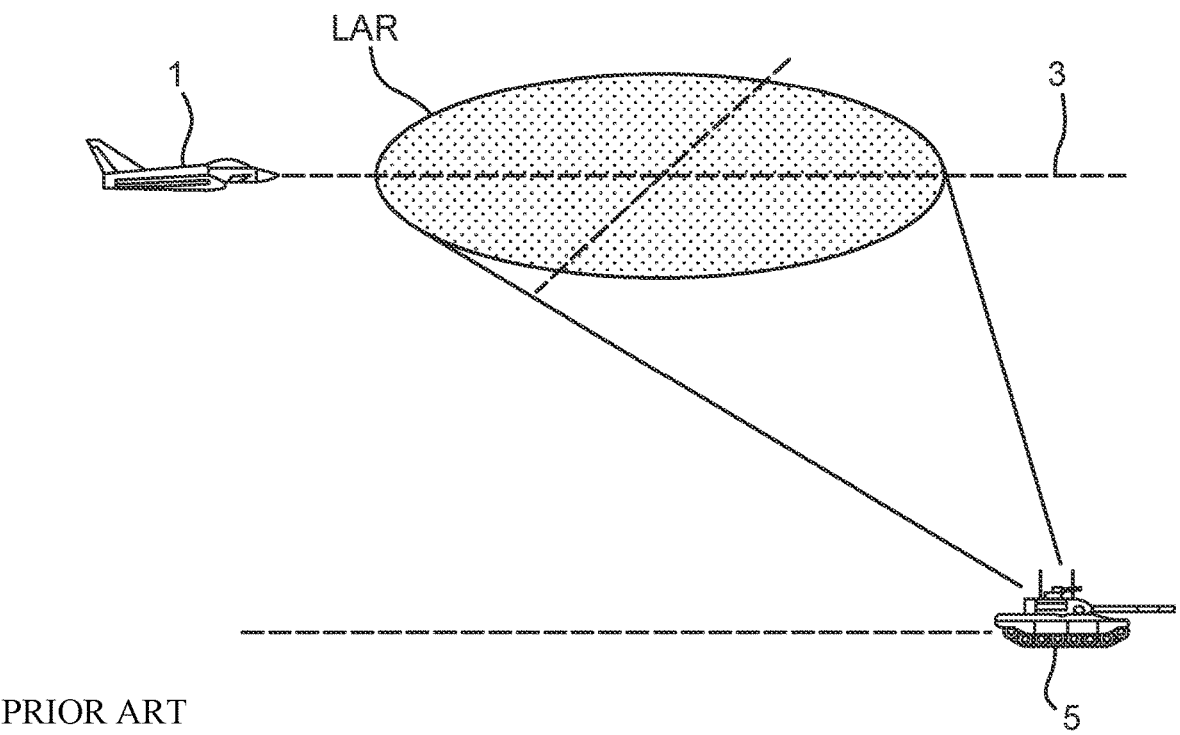
FIGS. 1a and 1b illustrate schematically a displayed Launch Acceptability Region (LAR) for an air-to-surface weapon, as calculated and displayed by a LAR system according to the prior art.
Figure 1B:
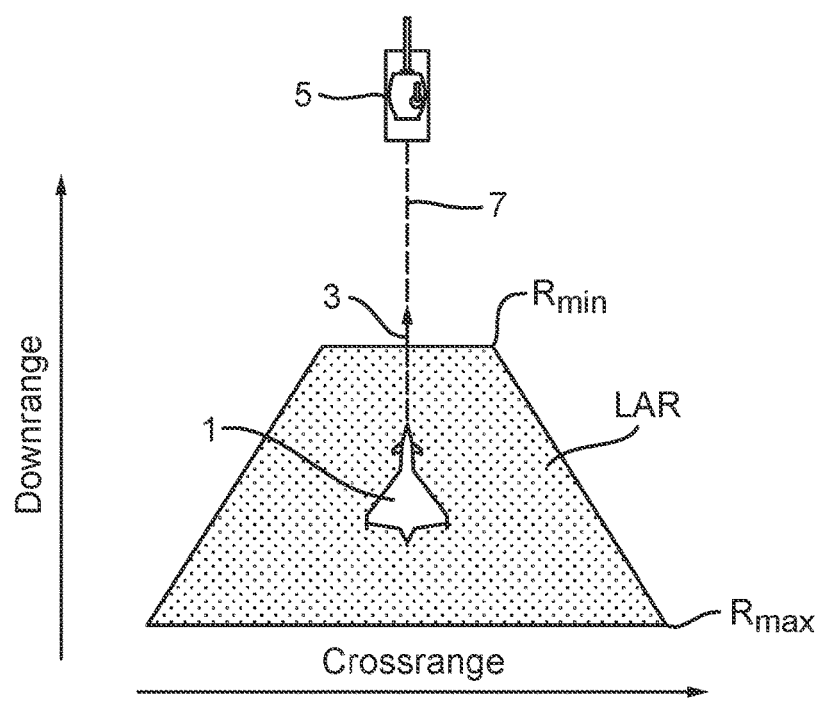
Figure 2:
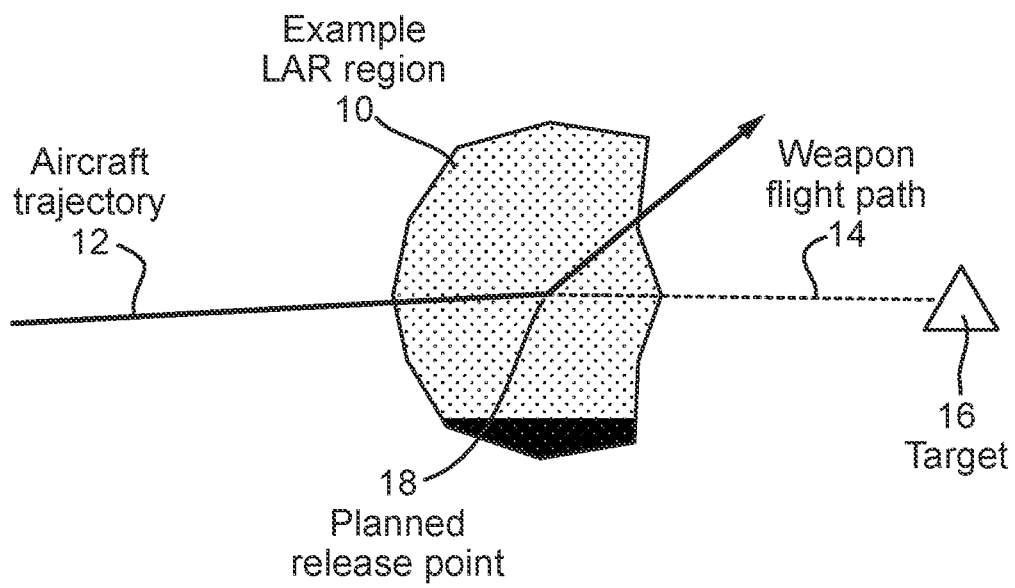
FIG. 2 is a schematic diagram illustrating a plan view representation of a LAR region computed by a OEM LAR "computer"

As will be known to a person skilled in the art, a typical LAR "computer" requires a number of input parameters, such as release heading, release velocity and release altitude, and can calculate corresponding LAR data accordingly. The manner in which data representative of a single LAR is calculated using a single set of input parameters, and the input parameters required to do so, may vary according to the specific LAR "computer" used, as will be known to a person skilled in the art, and the present invention is not necessarily intended to be in any way limited in this regard. Irrespective of the manner of calculation utilised, or the input parameters required to do so, suffice it to say that a conventional LAR "computer" accepts a number of input values representative of planned input parameters, and then calculates and outputs data representative of the acceptable release area for a weapon to impact the desired target. In known LAR systems, such data, thus calculated, i.e. the computed LAR data, is typically presented and displayed in two dimensions, as illustrated schematically in FIG. 2 of the drawings, which shows a computed LAR 10 in relation to the planned aircraft trajectory 12, the required/predicted weapon flight path 14 and the target 16. A planned release point is indicated at 18. It is to be understood that the displayed LAR 10 in FIG. 2 is intentionally generic and schematically represented, for explanatory and illustrative purposes only, and is not necessarily representative of the output from a 'real' LAR "computer".

The present invention extends the capability and utility of a conventional LAR "computer" by causing the LAR to computation to be repeated at a number of neighbouring values of the same input parameters to establish a corresponding LAR 'profile' comprising a plurality of computed LARs. Thus, referring to FIG. 3 of the drawings, an exemplary embodiment of the present invention may be configured to cause the LAR computation to be repeated a number of times at a number of respective values of the input parameter, release altitude, maintaining the same set of weapon performance parameters (as supplied by the OEM) and planned (other) input parameters (if required). In the illustrated example, the OEM LAR "computer" would, in accordance with the prior art, simply calculate the LAR 10 at a planned release altitude 'x' [FIG. 3(*iii*)], whereas an exemplary embodiment of the present invention is configured to receive as an input a value of 'x' and then cause the LAR 10 to be computed, not just at the value of x, but additionally at x+2000 m [FIG. 3(*i*)], x+1000 m [FIG. 3(*ii*)], x−1000 m [FIG. 3(*iv*)], x−2000 m [FIG. 3(*v*), and x−3000 m [FIG. 3(*vi*)], to provide respective LAR data corresponding to various release altitudes and in relation to the same aircraft trajectory, weapon flight path and target, and using the given weapon performance parameters and keeping any other input parameters required at a given, planned value.

Once the multiple LAR data sets have been computed, they can be visually represented simultaneously and positioned relative to each other to provide the operator with a much more informative display of LAR data than has previously been possible. Referring to FIG. 4 of the drawings, for example, the above-referenced data sets obtained by adjusting the release altitude can be displayed together as elevation views, with FIG. 4(*i*) illustrating (schematically) a resulting lateral view representative of the computed LARs, with each data set being positioned on the display relative to the others according to the respective value of release altitude used to perform the LAR computation, and FIG. 4(*ii*) illustrating (schematically) a corresponding longitudinal view of the same LARs, again arranged relative to each other according to the respective value of release altitude used for the LAR computation. The display, in this case, includes a representation of the platform and also an indication of the range of release altitude values used to generate the display (including the planned release altitude 'x' at which the single LAR would have been output in a prior art system and conventional use of the OEM LAR "computer"). It will be appreciated that, in the schematic displays of FIG. 4, each horizontal line is representative of a computed LAR at a particular release altitude, and its length is representative of the extent of the LAR (in relation to the platform 20) at that release altitude and in the direction of the displayed view (i.e. longitudinal or lateral relative to the platform). In contrast with the prior art systems that provide a plan view of a single LAR at a planned altitude, the present invention can provide a "side on view" of multiple LARs at multiple respective altitudes which provides a significantly enhanced awareness of the entire LAR and the impact of, in this case, altitude on the LAR with respect to the platform.

It will be apparent to a person skilled in the art from the display illustrated in FIG. 4, that the system and method of the present invention can, therefore, provide enhanced operator awareness by presenting significant additional information that can be valuable when planning a mission. In the specific example illustrated, it can be immediately seen that more favourable release conditions may be achieved by increasing altitude.

In the above-described example, the data sets representing computed LARs at respective release altitudes are displayed as discrete lines having a relative length representative of the extent of the associated LAR. However, some exemplary embodiments of the invention may be additionally configured to extrapolate between data sets to generate graduated intermediate data sets, and display these in addition to the displayed (computed) LARs, thereby creating an elevation visualisation that covers a larger span of variation and/or more detail between computed LARs, as illustrated schematically in FIG. 5 of the drawings.

It will be appreciated by a person skilled in the art, and as mentioned above, that the input parameters used by a OEM LAR "computer" to generate LAR data vary according to the specific OEM and/or payload in question. In the above-described exemplary embodiment of the invention, one of the input parameters utilised by the OEM LAR "computer" to calculate LAR data is release altitude, and it is this input parameter that is varied in accordance with the system/method of the invention, in the embodiment described above, to generate multiple respective LARs and create therewith the elevation views illustrated in FIG. 4 and/or FIG. 5 of the drawings. However, the present invention is not intended to be limited in this regard. A different or additional one or more of any of the specific input parameters utilised by the LAR "computer" employed may be varied to generate multiple respective LARs; and, where multiple input parameters are varied to generate respective LAR data sets, each such LAR data set may be generated by varying a single respective input parameter, independently of any subsequent or previous generation of a LAR data set by varying a different respective input parameter. Thus, for example, in the exemplary embodiment described above, and independently of the above-described altitude variation utilised to generated a first set of computed LARs in the manner described, a second set of computed LARs may additionally (or, indeed, alternatively) be generated by varying a different input parameter around a planned value of that input parameter, in order to visualise the impact of that input parameter on the LAR. Referring to FIG. 6 of the drawings, a system/method according to an exemplary embodiment of the present invention may be used to generate a set of computed LARs by varying release velocity, and the resulting elevation view(s) may be superimposed onto the corresponding view(s) showing the impact on LAR of varying release altitude. In FIG. 6, therefore, which illustrates the display of FIG. 5(ii) (longitudinal view) having superimposed thereon a corresponding view of the data set obtained by varying release velocity when computing multiple LARs, the impact of varying release velocity and that of varying release altitude can be visualised simultaneously, and relative to the platform 20.

In yet another exemplary embodiment of the present invention (not illustrated), the impact on the LAR of varying two (or more) input parameters may alternatively be visualised by computing each of the multiple LAR regions by varying, in each case, two (or more) input parameters and then displaying the resulting multiple LARs simultaneously. Thus, for example, a plurality of LARs could be computed, wherein for each computation, the values for both the release altitude and release velocity have been varied from those used in a preceding such computation, to generate a number of combined or "integrated" LARs representative of the computed LAR data corresponding to respective release altitude/velocity combinations.

It is to be understood that the present invention is not necessarily intended to be limited with regard to which, or the number, of input parameters are altered to generate a plurality of LARs for simultaneous display, nor is the invention necessarily intended to be limited in terms of the view depicted by the information display. Indeed, aspects of the present invention can be applied to any of the input parameters that a OEM LAR computer" or "computers" is/are configured to receive and utilise in LAR computation, and the present invention can be used to generate and visually present the effect of altering one or more of those parameters. It will be understood that the precise nature and layout of the visual presentation may, at least to some extent, be dependent upon the input parameters being adjusted to obtain the LAR data sets. More generally, aspects of the present invention are configured to generate and visually present an indication of how the LAR behaves at and around planned weapon release parameters (i.e. input parameters), thereby providing significant additional data within mission planning, presented in an intuitive manner, and providing an additional level of confidence in achieving weapon success, particularly but not necessarily exclusively, in the event of unplanned events; for example, providing an operator with immediate data, that is presented in such a way that it can be easily interpreted, to enable them to assess how the LAR becomes more marginal if the original planned trajectory cannot be followed during a flight. For the avoidance of doubt, the present invention is not necessarily intended to replace an existing OEM LAR "computer", but instead is primarily envisaged to be used to significantly increase the capability and utility of such a system in the manner described above and to provide the above-mentioned advantages, thus enabling it to be configured (in accordance with various respective exemplary embodiments of the invention) to cooperate with LAR "computers" of differing classifications and/or ITAR restrictions, although aspects of the present invention may also include (as one of its elements) a module having the conventional OEM LAR "computer" capability.

Aspects of the present invention can be configured to be applied, but not limited, to the following types of input parameters to a OEM LAR "computer":
  a fixed or variable number of neighbouring release altitudes, at graduations or intervals that are relevant to the desired application;
  a fixed or variable number of neighbouring release velocities, at graduations or intervals that are relevant to the desired application;
  a fixed or variable number of meteorological conditions, such as wind speed and/or direction, at graduations or intervals that are relevant to the desired application;
  one, more than one or all of the input parameters that a given LAR "computer" requires, at graduations or intervals that are relevant to the desired application.
  The manner in which the image data representative of the resultant computed LARs is subsequently processed and visually presented may also vary. For example, the image data may be represented by a two- or three-dimensional rendering, tabular or in a report style, and the present invention is not necessarily intended to be limited in this regard.

Indeed, it will be readily apparent to a person skilled in the art, from the foregoing description, that modifications and variations can be made to the described embodiments without departing from the scope of the invention as defined by the appended claims.

The invention claimed is:

1. A Launch Acceptability Region [LAR] display system for a payload-releasing platform, the system comprising:
  an input module configured to obtain or receive information relating to a target, a first value of at least one input parameter, and predefined payload performance parameters, wherein the at least one input parameter comprises one of altitude, velocity, or heading of the payload-releasing platform;
  a LAR computing module configured to:
    compute LAR data representative of a first LAR using the payload performance parameters, the target information and the first input parameter value; and
    compute LAR data representative of a second LAR using the payload performance parameters, the target information and a second value of the input parameter, wherein the first LAR and the second LAR are regions in which a payload released from the payload-releasing platform could impact the target; and
  an extrapolation module configured to receive said LAR data and extrapolate LAR data computed at input parameter values adjacent to the first and/or second input parameter values to generate intermediate LAR data;
    said image data generation module configured to receive said LAR data for each LAR and generate therefrom a set of LAR image data; and
    a display module configured to receive said set of LAR image data and display, simultaneously, a visual representation of each LAR, wherein the relative positions of said visual representations are based on their respective associated first or second input parameter values.

2. The system according to claim 1, wherein said visual representation of each LAR includes an indication of its respective associated first or second input parameter value.

3. The system according to claim 2, wherein said input module is configured, in response to receiving or obtaining said first input parameter value, to compute the second input parameter values based on a selected or predefined interval value.

4. The system according to claim 3, further comprising an extrapolation module configured to receive said LAR data and extrapolate LAR data computed at input parameter values adjacent to the first and/or second input parameter values to generate intermediate LAR data, and include in said set of LAR data said intermediate LAR data for input to said image generation module.

5. The system according to claim 2, further comprising an extrapolation module configured to receive said LAR data and extrapolate LAR data computed at input parameter values adjacent to the first and/or second input parameter values to generate intermediate LAR data, and include in said set of LAR data said intermediate LAR data for input to said image generation module.

6. The system according to claim 2, wherein said input module is configured to obtain or receive meteorological conditions for each of the first and second input parameter values and to compute the LAR data for each LAR using the meteorological conditions.

7. The system according to claim 1, wherein said input module is configured, in response to receiving or obtaining said first input parameter value, to compute the second input parameter values based on a selected or predefined interval value.

8. The system according to claim 7, further comprising an extrapolation module configured to receive meteorological conditions for each of the first and second input parameter values and to compute the LAR data for each LAR using the meteorological conditions.

9. The system according to claim 7, wherein said input module is configured to obtain or receive meteorological conditions for each of the first and second input parameter values and to compute the LAR data for each LAR using the meteorological conditions.

10. The system according to claim 1, wherein said input module is configured to obtain or receive meteorological conditions for each of the first and second input parameter values and to compute the LAR data for each LAR using the meteorological conditions.

11. The system according to claim 1, wherein a visual representation of LAR data representative of the first LAR is displayed superimposed on at least a second one of said sets of LAR data, and positioned relative thereto.

12. The system according to claim 1, wherein the display module is configured to display a visual representation of a set of LAR data relative to a visual representation of a current position of said platform.

13. The system according to claim 1, wherein said visual representation of LARs is in the form of a two- or three-dimensional render.

14. The system according to claim 1, configured to enable a user to select a format of display of said visual representation of LARs.

15. A computer-implemented Launch Acceptability Region [LAR] display method for a payload-releasing platform comprising:
obtaining or receiving information relating to a target (16), a first value of at least one input parameter, and predefined payload performance parameters, wherein the at least one input parameter comprises one of altitude, velocity, or heading of the payload-releasing platform;
computing LAR data representative of a first LAR (10) using the first input parameter value, the payload performance parameters and the target information;
computing LAR data representative of a second LAR (10) using a second value of the input parameter, the payload performance parameters and the target information, wherein the first LAR and the second LAR are regions in which a payload released from the payload-releasing platform could impact the target;
extrapolating each said LAR data computed at input parameter values adjacent to the first and/or second input parameter values to generate intermediate LAR data;
generating, from said LAR data for each LAR a set of LAR image data; and
displaying simultaneously, a visual representation of each LAR, wherein the relative positions of said visual representations are based on their respective associated first or second input parameter values.

16. A method of providing a Launch Acceptability Region (LAR) system for a payload-releasing platform, the method comprising:
configuring an input module to obtain or receive information relating to a target (16), a first value of at least one input parameter, and predefined payload performance parameters, wherein the at least one input parameter comprises one of altitude, velocity, or heading of the payload-releasing platform;
providing a LAR computing module (104) configured to:
compute LAR data representative of a first LAR (10) using the payload performance parameters, the target information and the first input parameter value; and
compute LAR data representative of a second LAR (10) using the payload performance parameters, the target information and a second value of the input parameter, wherein the first LAR and the second LAR are regions in which a payload released from the payload-releasing platform could impact the target;
receive said LAR data and extrapolate LAR data computed at input parameter values adjacent to the first and/or second input parameter values to generate intermediate LAR data;
configuring an image data generation module to receive said LAR data for each LAR and generate therefrom a set of LAR image data; and
configuring a display module to receive said set of LAR image data and display, simultaneously, a visual representation of each LAR, wherein the relative positions of said visual representations are based on their respective associated first or second input parameter values.

* * * * *